United States Patent
Wootten et al.

(10) Patent No.: US 8,894,050 B2
(45) Date of Patent: Nov. 25, 2014

(54) METHODS AND APPARATUS FOR SUSPENDING VEHICLES

(75) Inventors: Dennis K. Wootten, Scotts Valley, CA (US); Robert C. Fox, Los Gatos, CA (US); David M. Haugen, Pacific Grove, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 582 days.

(21) Appl. No.: 12/407,610

(22) Filed: Mar. 19, 2009

(65) Prior Publication Data

US 2009/0236807 A1 Sep. 24, 2009

Related U.S. Application Data

(60) Provisional application No. 61/038,015, filed on Mar. 19, 2008, provisional application No. 61/157,541, filed on Mar. 4, 2009.

(51) Int. Cl.

| F16F 9/342 | (2006.01) |
| F16F 5/00 | (2006.01) |
| F16F 9/06 | (2006.01) |
| B60G 17/048 | (2006.01) |
| F16F 9/48 | (2006.01) |

(52) U.S. Cl.
CPC ............ *F16F 9/063* (2013.01); *B60G 2300/12* (2013.01); *B60G 2600/21* (2013.01); *B60G 17/048* (2013.01); *B60G 2202/152* (2013.01); *B60G 2500/2064* (2013.01); *B60G 2500/22* (2013.01); *F16F 9/486* (2013.01)
USPC .................. 267/64.22; 267/64.18; 267/64.26

(58) Field of Classification Search
USPC .......... 267/64.25, 64.26, 64.28, 64.14, 64.15, 267/64.18, 64.22, 277; 188/284, 285, 289
See application file for complete search history.

(56) References Cited

U.S. PATENT DOCUMENTS

| 4,915,364 A | * | 4/1990 | Perlini | 267/64.26 |
| 5,649,692 A | * | 7/1997 | Gilsdorf et al. | 267/64.21 |
| 6,135,434 A | | 10/2000 | Marking | |
| 6,938,887 B2 | * | 9/2005 | Achenbach | 267/64.22 |
| 2003/0234144 A1 | * | 12/2003 | Fox | 188/278 |

FOREIGN PATENT DOCUMENTS

GB           1500714      *  2/1978

* cited by examiner

*Primary Examiner* — Vishal Sahni
(74) *Attorney, Agent, or Firm* — Patterson & Sheridan, L.L.P.

(57) ABSTRACT

Embodiments of the invention generally relate to methods and apparatus for use in vehicle suspension. Particular embodiments of the invention relate to methods and apparatus useful for variable spring rate and/or variable damping rate vehicle suspension. In one embodiment, a shock absorber for a vehicle includes a gas spring having first and second gas chambers. The first chamber is utilized during a first travel portion of the shock absorber and the first and second chambers are both utilized during a second portion of travel. The shock absorber further includes a fluid isolated damper for regulating the speed of travel throughout both portions of travel.

15 Claims, 13 Drawing Sheets

--Prior Art--

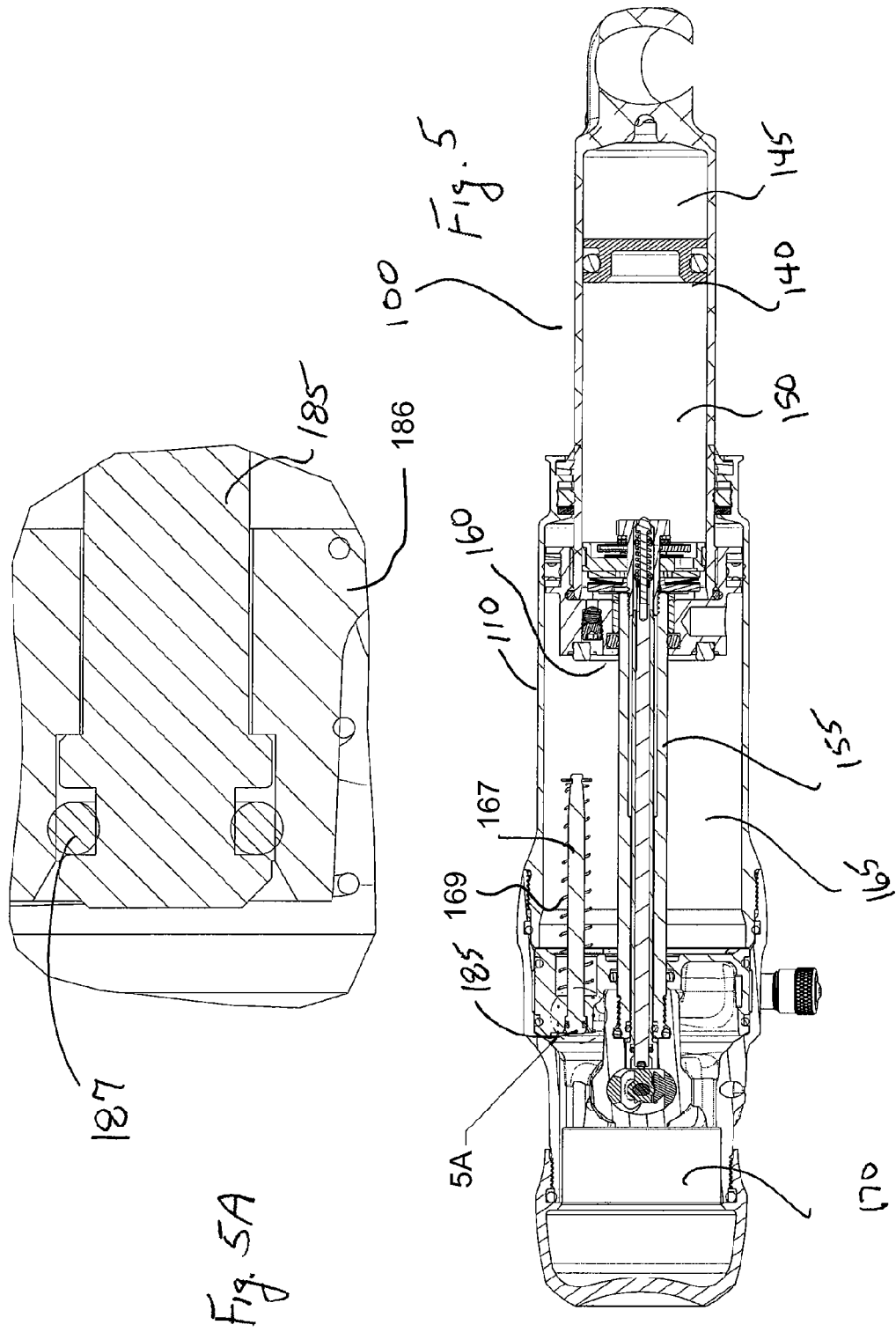

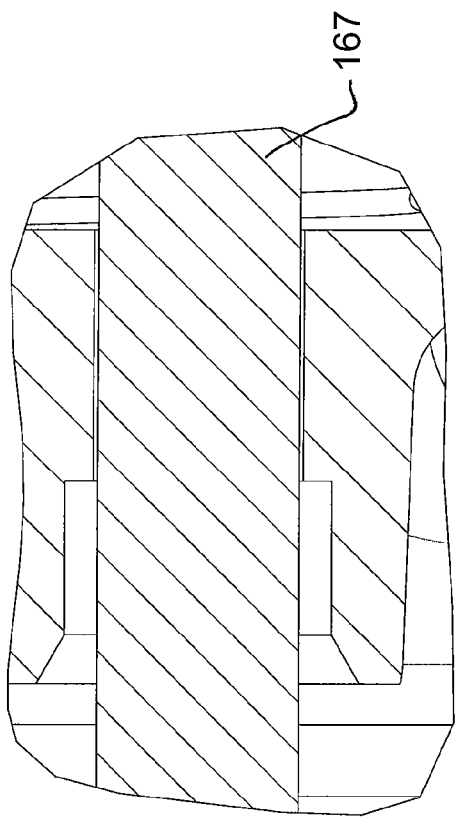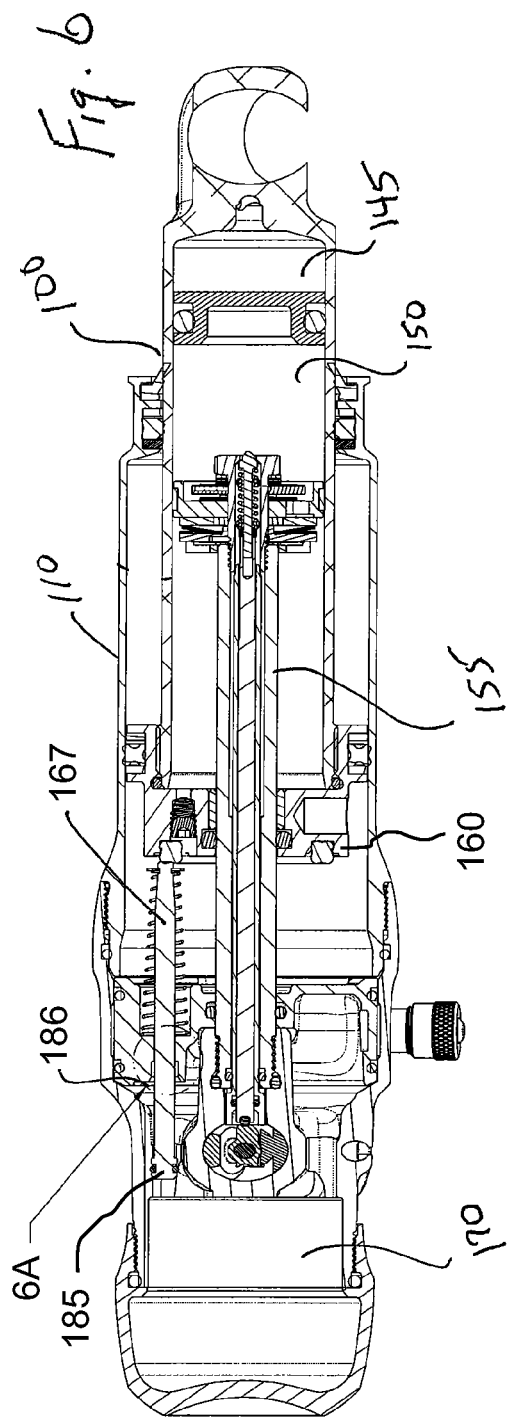

METHODS AND APPARATUS FOR SUSPENDING VEHICLES

CROSS-REFERENCE TO RELATED APPLICATIONS

This application claims benefit of U.S. provisional patent application Ser. No. 61/038,015, filed Mar. 19, 2008 and Ser. No. 61/157,541, filed Mar. 4, 2009, both of which are herein incorporated by reference.

FIELD OF THE INVENTION

Embodiments of the invention generally relate to methods and apparatus for use in vehicle suspension. Particular embodiments of the invention relate to methods and apparatus useful for variable spring rate and/or variable damping rate vehicle suspension.

BACKGROUND OF THE INVENTION

Vehicle suspension systems typically include a spring component or components and a damping component or components. Frequently those discrete components are separately mounted on a vehicle. Traditionally, mechanical springs, such as metal leaf or helical springs, have been used in conjunction with some type of viscous fluid based damping mechanism mounted functionally in parallel. More recently, compressed gas acting over a piston area has replaced mechanical springs as the spring component in some contemporary suspension systems. While compressed gas springs are usually lighter and more compact than their mechanical counterparts, the compression and expansion curve, and corresponding spring rate, is not linear and becomes particularly exponential beyond a mid range of gas compression. FIG. 1 is a graph showing a gas compression curve having such an exponential spring rate in an air shock based upon force and travel.

As can be seen in the Figure, the force (corresponding to pressure acting on a given piston area) versus the linear travel or displacement of the air spring is not linear. While the curve approximates linearity during an initial portion of travel, the last portion of travel is exponential. At higher travel values, the rate of increase of the force (pressure) for incrementally further travel is very large and the shock absorber is therefore increasingly more rigid in the last third of its stroke.

Sequentially activated gas spring chambers have been devised in an attempt to derive a more useable gas spring rate over a greater range of suspension travel. One such device is the subject of U.S. Pat. No. 4,915,364 which patent is incorporated herein, in its entirety, by reference. That patent describes some features of a gas spring for use in heavy vehicle applications (e.g. truck rear axles) and a Figure from that patent is included as FIG. 2. As is shown in the Figure, the spring includes a center shaft 44 having a mushroom valve 46 at an upper end that obstructs a gas flow pathway into a secondary gas chamber 54. As the gas spring operates, the shaft 44 in the center of the spring contacts an upper portion of a movable body, thereby opening the mushroom valve 46 and permitting the available gas chamber volume to be increased by the volume of the second chamber 54. A gas spring curve associated with the device of FIG. 2 is shown in FIG. 3. The point Q shows that point where the mushroom valve opens and combines the first and second gas chambers.

While the '364 reference teaches some basics of an air spring with dual chambers, it would be ineffective with many vehicle types. For example, the shaft 44 responsible for operating the mushroom valve 46 relies on gravity to close the valve as the gas spring rebounds. In many vehicle types, such a design is would be unworkable since vehicles often operate on uneven surfaces where the gravitational forces cannot be relied upon to consistently open or close a valve (and may cause arbitrary opening and closing with no functional benefit). Further, many vehicles include springs having axes mounted horizontally (or other non-vertical), upside down or at other angles inconsistent with gravity based operational features. Motorcycles, all-terrain-vehicles (ATVs) and bicycles are just some examples of vehicles that are designed for "off road" operation and require that components operate regardless of gravitational forces. Moreover, the design illustrated in the '364 patent is limited to use with simple air-type springs and not with more sophisticated mechanisms that include fluidly isolated dampers. The '364 patent suggests that the second gas chamber is prefilled to a predetermined pressure matching that of the lower chamber just prior to opening of the mushroom. However, there is no teaching as to how such a filling might take place, i.e., the pre-filling of essentially two separate chambers.

Accordingly, there is a need for a damped shock absorber that uses a multiple volume gas spring under a variety of loads and/or under a variety of travel settings. There is a further need for methods and apparatus to selectively direct gas pressure among and between a plurality of gas volumes and one that permits integration into a complex shock absorber that includes adjustable spring and dampening devices.

SUMMARY OF THE INVENTION

Embodiments of the invention generally relate to methods and apparatus for use in vehicle suspension. Particular embodiments of the invention relate to methods and apparatus useful for variable spring rate and/or variable damping rate vehicle suspension. In one embodiment, a shock absorber for a vehicle includes a gas spring having first and second gas chambers. The first chamber is utilized during a first travel portion of the shock absorber and the first and second chambers are both utilized during a second portion of travel. The shock absorber further includes a fluid isolated damper for regulating the speed of travel throughout both portions of travel.

In another embodiment, an adjustment member for initiating commutation between first and second gas chambers in a shock absorber has an adjustable length and is movable as the first chamber is compressed. The adjustment member is movable to a location whereby the member mechanically opens a valve, thereby initiating communication between the gas chambers.

In another embodiment, a method of operating a shock absorber having first and second gas chambers and a fluid isolated damper includes compressing the first chamber to a predetermined volume; initiating communication between the first chamber and the second chamber; further compressing the first chamber; closing the communication path between the chambers; decompressing the first chamber; and regulating the speed of at least one of the compression and decompression of at least the first chamber.

In another embodiment, a method of operating an air shock having two gas chambers includes compressing the first chamber to a predetermined first amount; initiating communication between the first and second chambers; closing communication between the chambers; compressing the first chamber to a predetermined second amount; initiating communication between the first and second chambers; and closing communication between the chambers.

In another embodiment, a Schrader-type valve for filling a first and second air chamber to an equal pressure includes an axially movable stem member depressible to communicate with the first chamber through a first port and further depressible to communicate with the first and second chambers through a second port.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only certain embodiments of the invention and are therefore not to be considered limiting of its scope, for the invention may admit to other equally effective embodiments.

FIG. 5 shows a section view of a shock absorber of FIG. 4 in an extended position and FIG. 5A is an enlarged view of a closed communication valve.

FIG. 6 shows the shock absorber of FIG. 5 in a retracted position and FIG. 6A is an enlarged view of the communication in an open position.

DETAILED DESCRIPTION OF THE PREFERRED EMBODIMENT

In this disclosure the term "air" is used interchangeably with the term "gas" unless otherwise stated. Both terms generally indicate a compressible fluid. One embodiment comprises an air spring shock absorber for a vehicle. In one embodiment the vehicle is a bicycle. The air spring is advantageous because it includes at least two sequentially activated gas spring chambers that operate to increase the effective gas volume of the spring, at least one communication valve for opening a fluid flow path between the chambers, and a fill valve for selectively applying gas pressure within the chambers. In one embodiment the fluid path between the chambers is opened using a mechanical actuator and in another embodiment, a pressure actuated valve opens the fluid path between the chambers. In one embodiment, at least two air chambers can be filled from the same pressure inlet either simultaneously or sequentially as preferred. In one embodiment both chambers of a dual gas chamber gas spring can be filled simply in one pressurization step.

In one embodiment, the multiple gas chamber spring can further include and operate in conjunction with a damper. In one embodiment the damper comprises a viscous fluid that is isolated from the compressible spring fluid. Separation of the damping fluid from the spring fluid avoids or delays the formation of fluid emulsion during vigorous dynamic mixing of the two fluids. The avoidance of emulsion formation is desirable because emulsified liquids do not function efficiently as damping fluids as compared to relatively pure liquids. Emulsion formation can result in what is known as damping "fade" where the efficiency of a mixed fluid damper diminishes with use. Such viscous fluid may be isolated or distanced from the fluid spring in various ways. For example, such isolation may be facilitated by a barrier, by gravity or by a tortuous path. A relevant feature of the isolation mechanism is that the damping fluid and the spring fluid are not co-located in the in the same dynamic volume. By providing some degree of isolation or separation between the damping and spring fluids, which are often liquid and gas respectively, the formation of emulsion is avoided or greatly delayed. In one embodiment the combined versatility of an adjustable or "tunable" damper and the multi-chamber spring result in a shock absorber having a selectively variable force versus travel versus velocity curve (e.g. 3-d surface as plotted). In yet other embodiments the multi-chamber air spring is utilized to improve the overall performance of a shock absorber having a damper with automatic "blow off" features.

Figure 1:
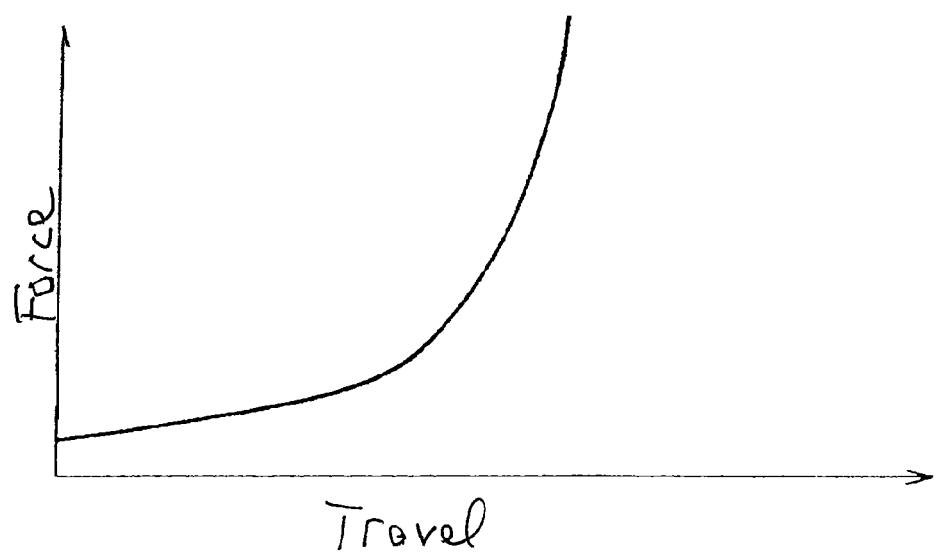
FIG. 1 shows a typical air spring curve generated by a conventional air spring operating on compressed gas.
Figure 2:
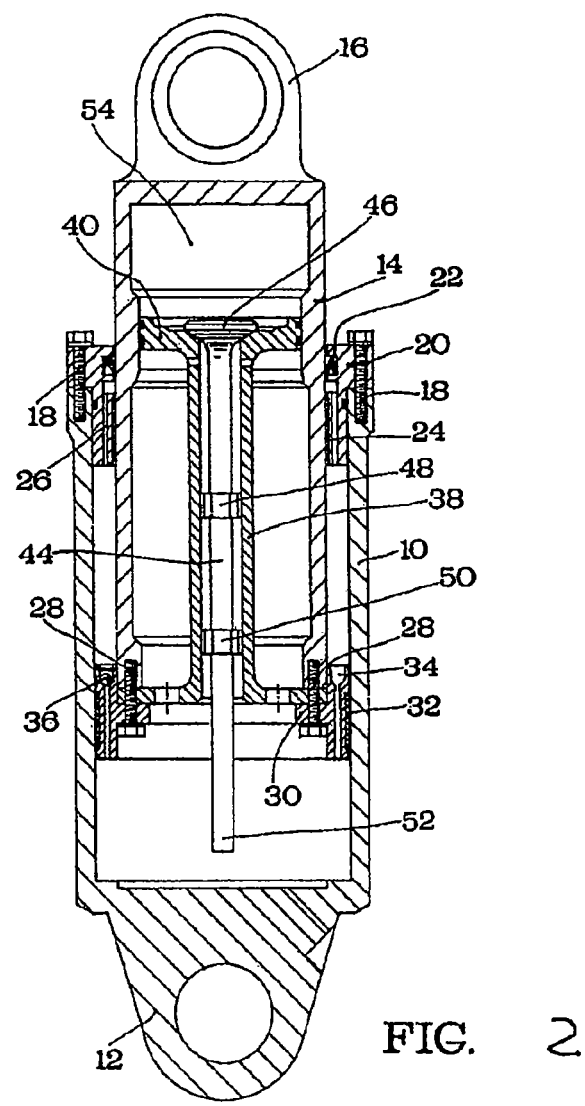
FIG. 2 is a section view of a device that teaches a second gas chamber intended to increase the effective gas volume usable by the air spring.
Figure 3:
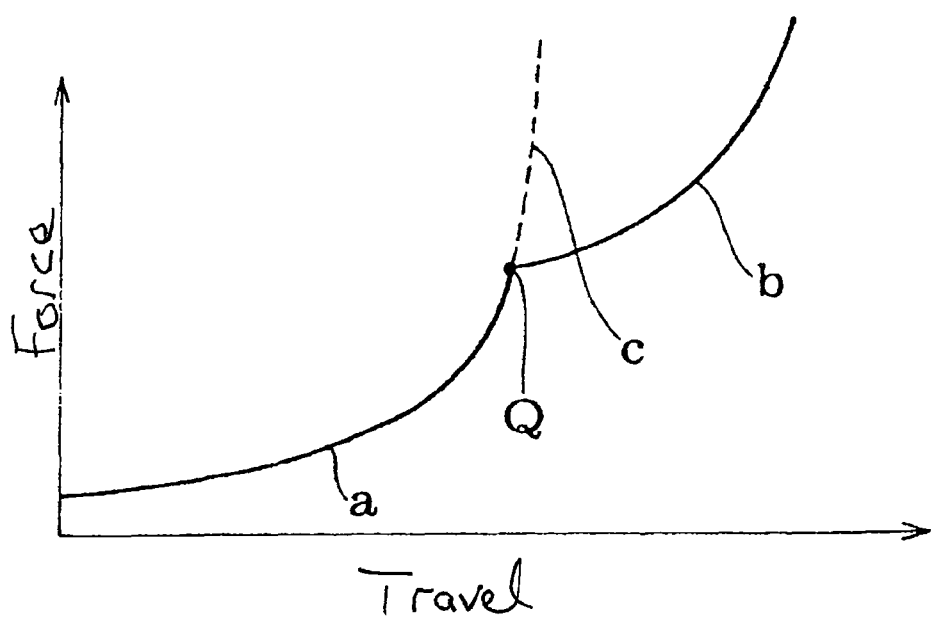
FIG. 3 shows an air spring curve generated by the device of FIG. 2.

A piston in cylinder type suspension gas spring preferably includes enough gas volume so that the gas compression curve, for a corresponding suspension system, remains substantially linear over a portion of the stroke (e.g. first ⅔rds) of the suspension system. Because pressure due to gas compression increases exponentially, simple gas springs, as a practical matter, have spring rates that are often too low over the first half of the stroke and too high over the second half. Because the spring rate is initially too low, the initial gas pressure in a gas spring shock absorber must be set high to yield a usable shock absorber (e.g. one that isn't too soft). Unfortunately such a shock absorber, as it is compressed, becomes quickly very stiff and allows little "settle" or "sag" when the shock initially loaded. Because proper initial "sag" improves vehicle ride and handling, lack of proper "sag" can negatively affect handling characteristics of a vehicle. Embodiments described herein extend the substantially linear portion of the spring rate curve beyond that represented by the single chamber curve of FIG. 1 and therefore allow for higher initial pressure settings without overly accelerating the onset of unusable stiffness during compression.

As vehicle use becomes more extreme there is a need for increased suspension stroke. With single chamber air springs good linear spring rate and usable stroke typically makes up a little over half of the mechanical stroke. Usually the greater the mechanical stroke, the longer the suspension (telescopic) must be. In a single chamber air spring, the length might increase 1.5 inches for every additional inch of usable linear rate stroke. Many vehicles have suspension envelopes that do not necessarily have the length required to accommodate the stroke required for desired vehicle performance. The multi-chamber air spring allows for increased usable stroke without as much increased overall length. Additionally, as the suspension requirements become more robust, the strength of the suspension package must increase. Again, the vehicle design envelope may not allow enough space for such an increase in conventional parallel dampers and springs. An integrated viscous damper/spring assembly reduces space requirements. As suspension stroke requirements increase and the suspension systems become correspondingly longer, it is desirable to have the characteristics of different gas spring volumes at different points in the stroke in order to maximize approximate linear and usable spring rates.

Figure 4:
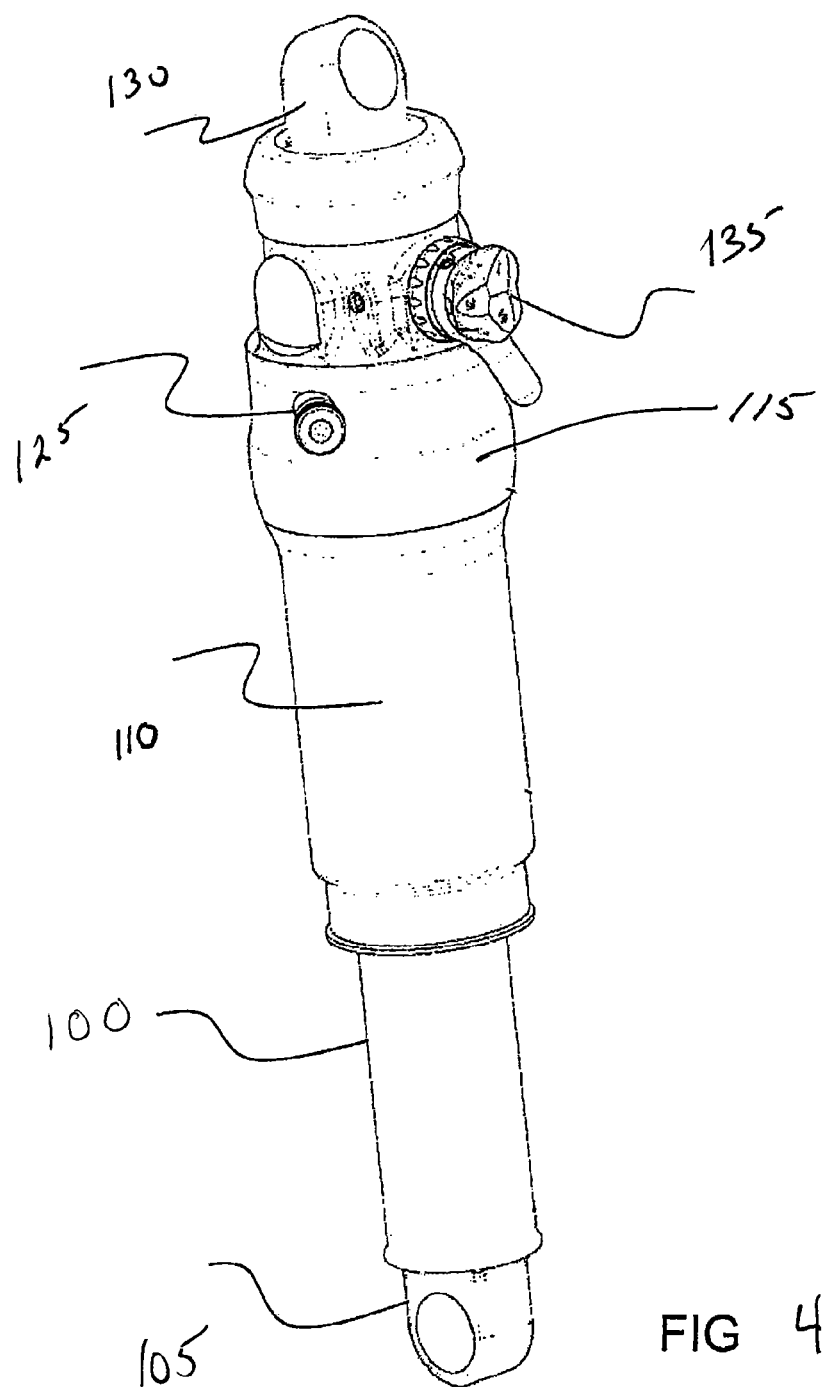
FIG. 4 shows an external view of a vehicle shock absorber embodiment incorporating aspects of the present invention.

Referring to FIG. 4, an external view of a gas spring vehicle shock absorber, optionally a rear bicycle shock absorber, is shown. The embodiment includes a damper body 100 having a lower mounting eye 105 preferably connected to an end thereof. The damper body 100 is telescopically disposed within an air sleeve 110 such that movement of the damper body 100 in and out of the air sleeve 110, against air pressure internal to the sleeve 110, compensates for, or absorbs, disparities in the terrain being traversed by the bicycle. The air sleeve 110 includes an upset 115 corresponding to an internal by-pass port that allows pressure to equalize across a gas compression piston, carried by an upper end of the damper body 100, as the piston passes the recess, corresponding to the upset 115, in the internal surface of the air sleeve 110. An upper portion of the air sleeve 110 includes a gas fill valve (inlet and bleed) 125 which may typically be a Schrader-type valve or any other suitable valve mechanism. The upper portion of the air sleeve 110 also includes an upper mounting eye 130. While mounting eyes 105 and 130 are shown in random orientation relative to one another and to the shock absorber generally, it is noted that eyes 105 and 130 may be aligned or disposed in any other suitable relative orientation. The rear bicycle shock absorber of FIG. 4 also includes a damper stiffness adjustment lever and knob assembly 135 (including "blow off" adjustment) for adjusting damping characteristics of the shock absorber.

FIG. 5 shows a cut away view of the shock absorber of FIG. 4 and its corresponding internal parts. In FIG. 5, the shock absorber is shown in a fully extended position. In one embodiment, a damper body 100 is hollow and contains a floating piston 140 moveably disposed therein. The floating piston 140 divides the interior of the damper body 100 into a compensator gas chamber 145 and a compression damping fluid chamber 150. In use, the compensator gas chamber 145 volume is reduced, by downward movement of the floating piston 140, in proportion to the volume of the damper support shaft 155 that enters the rebound damping fluid chamber 160 (not visible in the extended position) as the damper body 100 moves telescopically into the air sleeve 110 during the compression of the shock absorber. U.S. Pat. Nos. 6,105,988 and 6,311,962 show a structure of a gas spring and damper assembly and U.S. Pat. No. 6,360,857 shows a structure of a damper having some adjustable features and each of those patents are incorporated herein, in their entirety by reference.

As the damper body 100 moves in compression, carrying the gas compression piston 160 correspondingly further into the air sleeve, the volume of the first gas spring chamber 165 is reduced, thereby compressing or further compressing, the gas in the first gas spring chamber. In the embodiment of FIG. 5, a communication valve 185 is disposed at the upper end of a communication valve shaft 167. The valve, which is normally closed due to a biasing member or spring 169, opens upon the application of an axial force to shaft 167, to allow communication between the first gas chamber 165 and a second gas spring chamber 170. In one embodiment the axial force is supplied by contact with the moving compression piston 160. Valve 185, with its seal ring 187 blocking a fluid path through the valve seat, is shown in FIG. 5A.

In one embodiment, the gas pressure in the first gas spring chamber 165 continues to increase until the top of the gas compression piston 160 impinges upon the lower end of a communication valve shaft 167. This position of the communication valve shaft 167 is illustrated in FIG. 6, showing the shock absorber of FIG. 5 in a retracted position and wherein a second gas spring chamber 170 is exposed to the first chamber. In the position shown in FIG. 6, the force exerted by the gas compression piston 160 on the lower end of the communication valve shaft 167 moves valve member 185 off of a valve seat 186, thereby opening a fluid flow path through valve seat 186 and between the first gas spring chamber 165 and the second gas spring chamber 170. As a result of the fluid communication between the two gas spring chambers 165, 170 in FIG. 6, any pressure differential between the chambers equalizes. Additionally, the effective volume of the shock absorber gas spring is increased over the volume of the first gas spring chamber 165 by the volume of the second gas spring chamber 170. The flow path between the chambers 165, 170 may provide open fluid communication such that pressure loss through the flow path is minimal or negligible at typical compression/rebound velocities of the damper body 100.

In the air spring shock absorber disclosed herein, there are several parameters that can be varied in order to derive a preferred travel versus pressure (i.e. force) profile, or "spring rate" profile over the range of travel. Variables that may be selectively altered include: length and diameter of the first chamber 165, volume of the second chamber 170, initial pressure state of the first chamber 165, initial pressure state of the second chamber 170 and length and/or position of the communication valve shaft 167. In one embodiment, piston areas of a pressure divider and initial check valve spring load may be varied.

The initial pressure state and the diameter of the first chamber 165 define the shape of the travel versus spring pressure profile for the shock absorber prior to opening the communication valve 185. The location, along the travel, of the opening of the valve 185 determines when the spring force/travel curve of the first chamber alone is altered and combined characteristically with the second, or additional, chamber(s). Preferably, the values chosen for those variables result in a substantially linear spring rate prior to, and following, fluid communication between the chambers 165, 170. In one embodiment, the initial pressure in the second chamber 170 is set to equal a pre-calculated pressure in the first chamber 165 corresponding to a point just before the gas compression piston 160 contacts the lower end of the communication valve shaft 167. When the communication valve 185 is opened with such a second chamber 170 pressure setting, there is no significant differential pressure, at that point, between the first 165 and second 170 chambers and hence the force versus travel curves before and after are blended together at the transition. Further, there is no significant system pressure drop when the chambers 165, 170 are fluidly communicated. The gas spring volume is increased by the amount of the second chamber 170 and the spring rate is correspondingly decreased. However, the transition from the spring rate associated with only the first chamber 165 to the spring rate associated with the combined chambers 165, 170 is relatively smooth (in one embodiment to the point where the combined volumes produce a spring rate approximating a constant).

Figure 7:
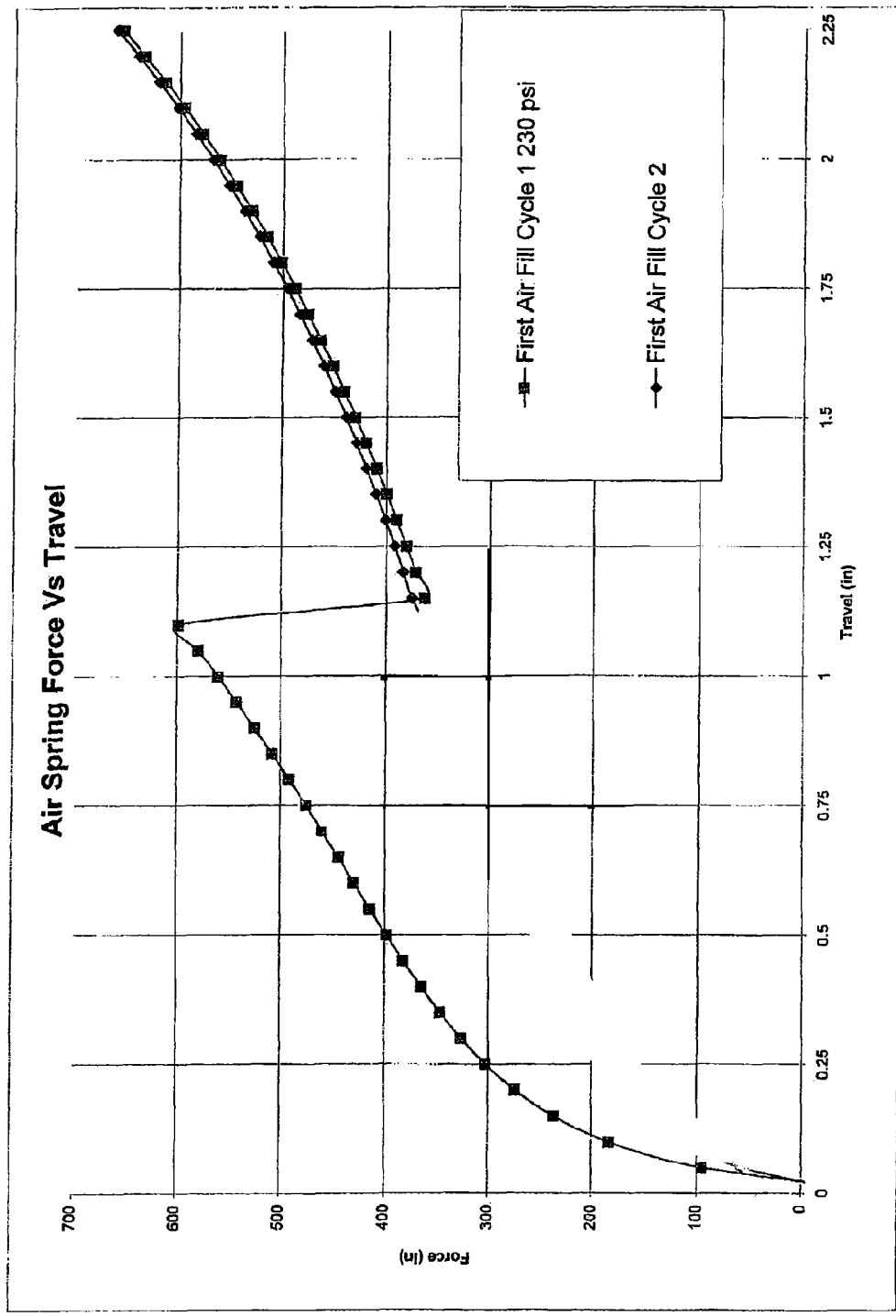
FIG. 7 is an air spring curve generated by the shock absorber of FIG. 5.

Alternatively the initial pressure in the second chamber 170 may be set at the same pressure (and time) as the initial (fully extended) pressure in the first chamber 165. During an initial compression of the shock absorber the volume of the first chamber 165 is reduced and the pressure in the first chamber 165 rises until the communication valve 185 is opened. Because the second chamber pressure is still at its initial (and now lower) pressure setting, fluid flows from the first chamber 165, through the communication valve 185 and into the second chamber 170 when valve 185 is opened. The pressure in the now-combined first and second chambers equalizes at a pressure value somewhere between the pre-communication first chamber pressure and the initial second chamber pressure (the equalization pressure depends on the relative volumes of the first and second chambers and the first chamber displacement that occurs prior to equalization). The slope of the force versus travel graph (based on effective spring rate) for the forgoing arrangement, both before and after the valve 185 opens is exemplified as illustrated in the curve of FIG. 7. During subsequent compression cycles of the shock absorber, the second chamber 170 retains the compression pressure of the first chamber 165 as a set point and no further equalization occurs upon opening of the communication valve 185. Optionally, a one-way valve (e.g., check valve) is included between the chambers and permits communication from the second to the first chamber. In this manner, compressed air is allowed to escape from the second to the first chamber upon extension of the shock absorber, thereby resetting the second chamber to a lower pressure, the pressure determined by the characteristics of a spring-biased valve (e.g. higher spring bias equals greater retained differential pressure where lower bias equals more equalization), for example.

It may be desirable to select the point in the travel at which the first 165 and second 170 chambers are communicated. In one embodiment the communication valve shaft 167 is available in different lengths. A user may install a longer length valve shaft 167 for communication earlier in the shock compression stroke or a shorter length for communication later in the shock stroke.

In the embodiment shown in FIGS. 5 and 6, the communication valve 185 and shaft 167 are not coaxial with the center line of the shock absorber, thereby allowing the damper support shaft 155 to be coaxially located. The damper support shaft includes control mechanisms through or around the shaft 155 for selectively adjusting and/or blocking valves or orifices of the damper assembly to effect changes in damping rates, lock-out and/or blow-off of the damper. The damper assembly is preferably mounted on a coaxial (with the damper body) shaft to minimize any bending and binding of the damping piston assembly (created by asymmetric damping fluid induced forces) during use. The eccentric placement of the communication valve 185 and shaft 167 allows isolation of the damping fluid (e.g. oil) from the spring fluid (e.g. pressurized gas) in an integrated unit, thereby reducing the possibility of damping fade (i.e. intermingling of spring gas and damping liquid where the emulsion reduces the effectiveness of the liquid phase as a damping medium) during extended periods of use. The shock absorber shown in the Figures illustrates such an isolated arrangement including a floating piston/gas chamber compensated damping system.

Figure 8:
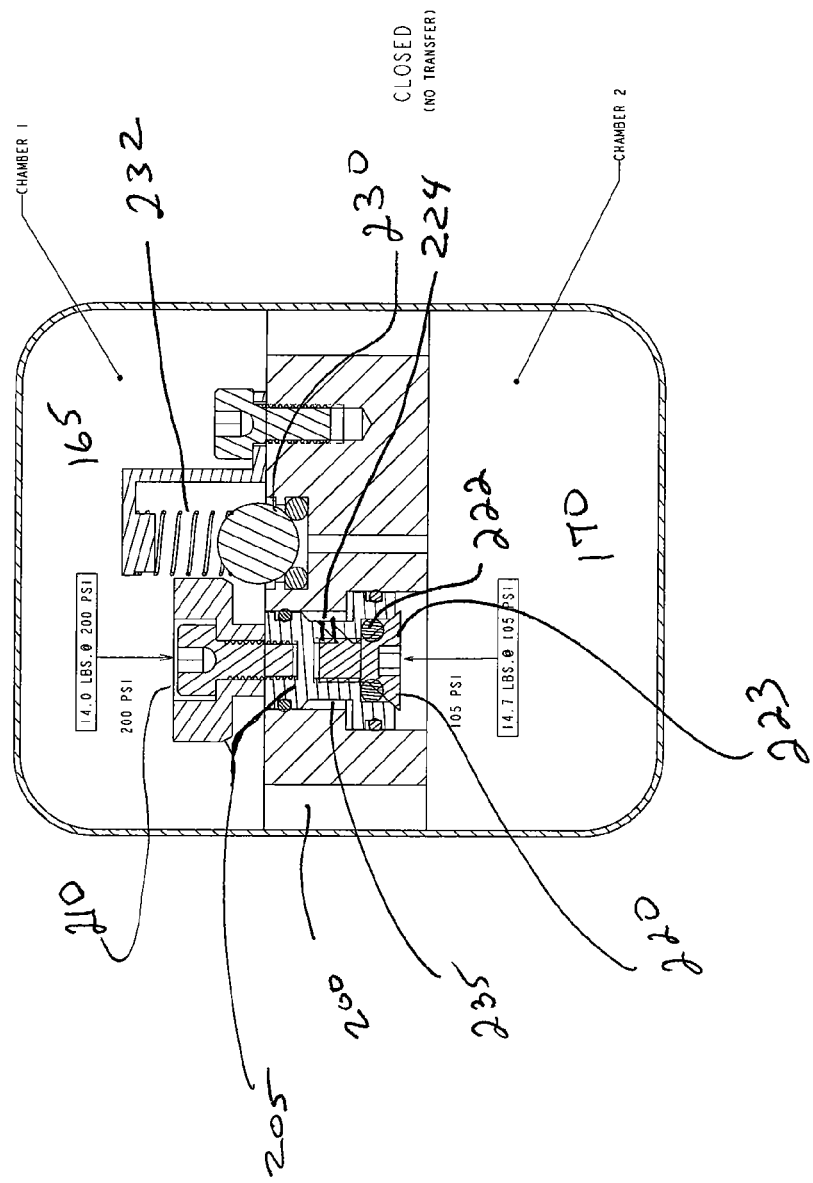
FIG. 8 shows an alternative mechanism for opening the second, or additional, gas chamber of the air shock, the mechanism shown in a closed position.
Figure 9:
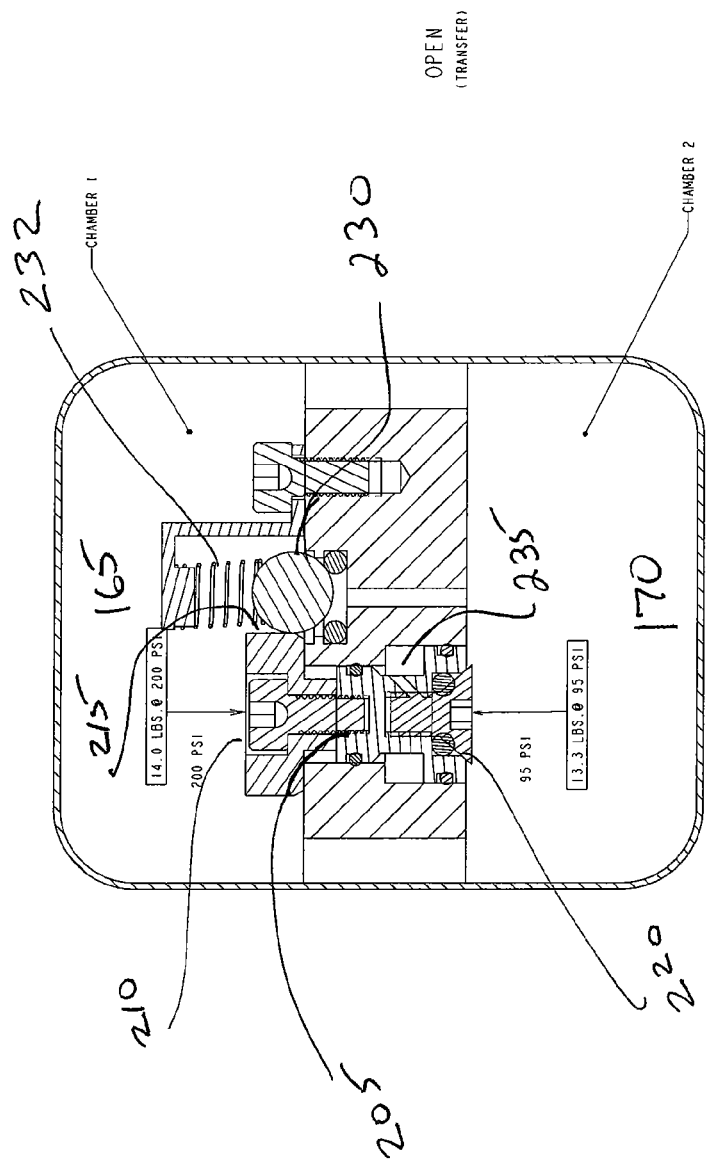
FIG. 9 shows the mechanism of FIG. 8 in an open position.

In one embodiment, a pressure divider 200, as illustrated in FIGS. 8 and 9, may be used in lieu of, or together with, the communication valve 185 and communication valve shaft 167 to facilitate selective tailoring of the spring rate curve (i.e. communicating between first and second chambers 165, 170). The pressure divider is disposed to maintain a known differential pressure between the first 165 and second 170 chambers upon opening of a valve therebetween. In one embodiment, the divider includes a moveable assembly 210 with two opposing, outwardly facing piston surfaces. A first piston surface 205 is exposed to the first chamber 165 and a second piston surface 220 is exposed to the second chamber 170. In one embodiment, the area of the second piston surface 220 is larger than the area of the first piston surface 205. The divider 200 additionally includes a normally closed, spring-biased pressure relief valve 230 designed to permit fluid communication from the second 170 to the first chamber 165 while normally checking flow in the reverse direction. FIG. 8 shows the divider prior to actuation. The piston 220 facing the second chamber 170, because of its relatively large surface, keeps the piston assembly 210 biased towards the first chamber 165. The pressure relief valve 230 remains closed as there is insufficient pressure to cause it to act against its biasing spring.

FIG. 9 shows the valve assembly upon actuation, which is brought about by compression of the first chamber 165 to a point wherein the difference in surface area of the pistons 205, 220 is overcome by the increased pressure in the first chamber 165 and the piston assembly is moved towards the second chamber 170. In the position shown, a radially extending lip 215 disposed about the perimeter of smaller piston side of the piston assembly 210 upsets the pressure relief valve 230 and pushes it laterally off of its seat. In this position, the pressure relief valve permits gas to travel through it in a reverse direction (i.e. normally checked direction from the primary 165 to the secondary 170 gas chamber). As soon as the pressure in the second chamber 170 increases, the larger piston 220 associated with that chamber causes the piston assembly to shift, letting the pressure relief valve 232 to return to its normally closed position. Because the second chamber 170 remains pressurized, its pressure overcomes the biasing spring 232 of the pressure relief valve 230 permitting pressurized gas to return from the second chamber 170 to the first chamber 165 as the shock subsequently extends during rebound. In this manner, the pressure divider is reset and ready for another cycle of opening the second chamber at a predetermined pressure of the first chamber. In another embodiment, the pressure relief valve 232 is a laterally actuated valve but does not have a check function and thereby permits the second chamber to remain at its higher pressure after communication between the chambers has ceased. In this embodiment, flow of air into the second chamber is still possible through a valve, such as a laterally actuated gate valve, that becomes offset by the lip 215, but flow from the second chamber is prevented.

The pressure divider 200 is shown having a 2:1 area ratio. However, any suitable ratio may be used, (by providing suitably sized piston areas), in order to facilitate the maintenance of desired differential pressures. In one embodiment the piston area of 220 is smaller than the piston area of 205 and the chambers are not communicated until very late in the travel corresponding to a high pressure in the primary chamber. The spring rate of the spring 232, and its initial state of compression, versus the seal area of the valve 230 dictate how much pressure bleed from the second chamber 170 to the first chamber 165 occurs as the shock rebounds from a compression stroke. In one embodiment, the spring is set so that the second chamber 170 retains a portion of the compression pressure corresponding to a selected amount of compression travel where the gas compression curve for the first chamber 165 is beginning to turn significantly exponentially higher. The check valve spring initial set load, by allowing retention of a given amount of the previous compression stroke, correspondingly allows the total force versus travel curve to exhibit a smoother transition upon communication of the two chambers 165, 170. It is also noteworthy that, while no vent hole is shown, or absolutely necessary, the volume 235 shown in the Figures represents a volume that may be vented to atmosphere. In any case, the volume is such that any increase in pressure as the piston assembly shifts will not adversely effect the operation of the pressure divider. The screw 223 and o-ring 222 serve to seal port 224 which communicates with volume 235. During assembly the piston assembly 210, without the screw 223 and o-ring 222, may be inserted into the pressure divider and gas trapped in 235 may vent so that the piston may be easily inserted. When the piston assembly 210 is in place, screw 223 and o-ring 222 are installed thereby sealing volume 235.

As illustrated in the Figures, the air spring is intended in some embodiments to be utilized in a shock absorber system that includes a damper and the operation of the first and secondary chambers permit the damper to operate in its most effective way over the course of the shock's operation. For example, a damper is most effective during the linear part of the gas spring curve when, depending upon the speed at which the shock is operating, the damper meters fluid from one side of a piston assembly to the other, effectively absorbing (ultimately converting it to heat and dissipating it) energy. During the non-linear (exponentially increasing spring stiffness) part of the spring curve, the damper provides less or virtually no damping action since the shock has become so stiff that movement of the shock is limited and the damper is unable to meter significant fluid. The dual chamber arrangement described herein permits the linear portion of the spring curve to continue through a greater range of shock travel and delays the less desirable non-linear portion, thereby resulting in an improved overall shock absorber function including damping.

In one embodiment the shock includes a damper lock which substantially prevents fluid transfer from taking place within a portion of the damper. The lock is configured so that the damper becomes substantially rigid when the fluid transfer path is blocked. Such a feature allows a user to selectively lock the shock into a substantially rigid configuration in order to minimize "pedal bob" or other vehicle power dissipation due to unwanted shock compression under power. Even when locked there is the possibility that a disparity in the terrain will require activation of the shock to prevent damage to the shock and/or vehicle. For that reason the shock having a damper lock as described may also be equipped with a blow off feature. One such damper lock/blow off feature is described in U.S. Pat. No. 7,163,222 which patent is incorporated herein by reference in its entirety. In one embodiment, the dual chamber air spring is used with a damper having an adjustable blow-off feature. The blow off feature is an automatic override permitting the damper in a "locked out" shock absorber to operate and meter fluid if subjected to a rapid shock event, like a sudden, abrupt bump in a road. With the dual air chamber, a suddenly operated or "blown off" damper will be more likely to be operating in a linear portion of the spring curve.

Figure 10:
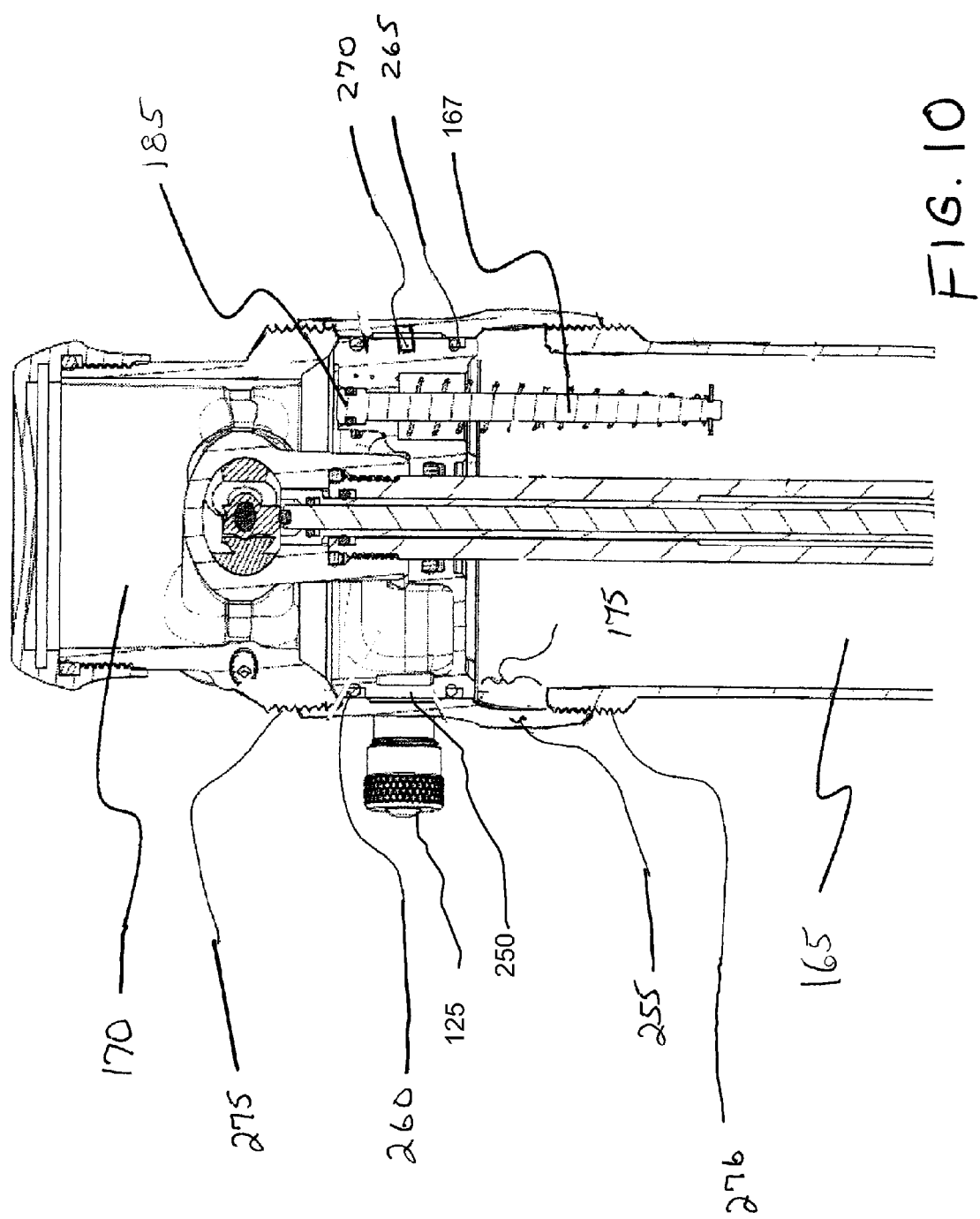
FIG. 10 is a section view showing an adjustable arrangement for selecting a point at which the two gas chambers communicate.

In another embodiment, illustrated in FIG. 10, a movable divider or bulkhead is located within the shock absorber permitting the volume of the first and second chambers to be adjusted by a user. FIG. 10 shows generally a pressure containing bulkhead 250 that is sealed in a nut 255 by a pair of O-rings 260, 265. The bulkhead also includes a Schrader valve assembly 125 and is retained axially and rotationally within the nut by a key member 270. In the Figure, the nut is shown in an uppermost position and axially abutted relative to the upper housing that includes secondary chamber 170. A gap 175 is located between the bulkhead 250 and the lower housing so that relative movement may occur before axial abutment between the bulkhead and the housing. Mating threads 275, 276 are cut in a same direction (e.g. both are right handled threads) and have the same pitch and major/minor diameter. When a user rotates the nut clockwise (as gauged from above the shock) the gap 175 closes and an axial space or gap correspondingly forms between the nut 255 and the upper housing. In this manner, the bulkhead 250 is effectively moved downward relative to the lower housing, thereby reducing the volume of the first chamber 165 and ensuring the second chamber 170 will be opened at an earlier point in the travel of the shock during a compression stroke.

In another embodiment intended to permit a user to adjust the length of the stroke prior to opening the second chamber, the communication valve 185 and valve shaft 167 and valve seat 186 are designed to be axially adjustable relative to the bulkhead 250. Referring to FIG. 10 for example; the valve 185 may be seated in an axially movable tubular shaped seat (not shown) that is sealed by a circumferential o-ring (not shown) between the seat body and the bore and axially movable relative to a bore (not shown) in the bulkhead. Further, the seat may have a cage (not shown) extending upwardly, toward the second chamber, there from where the cage culminates in a threaded nut (not shown) having a center axis substantially coincident with a center axis of the valve and seat. The cage and nut are positioned from the valve such that there is ample space to accommodate axial movement of the valve up into a volume surrounded by the cage and upwardly bounded by the nut. A knob (not shown) for manipulation is installed at an upper end of the shock absorber. The knob is connected to a shaft (not shown), threaded at a lower end thereof, where a smooth portion of the threaded shaft extends through an upper wall of the second chamber and is sealed there through by a seal (e.g. o-ring) so that the shaft transmits rotation through the wall of the second chamber. The knob and the shaft are substantially coaxial with the valve and seat and the shaft is threadedly engaged with the nut. The shaft does not obstruct upward movement of the valve relative to the seat. Rotation (by a user for example) of the knob in turn rotates the shaft which in turn causes the shaft to turn within the nut. The nut is raised or lowered depending on the sense of the threads of the engaged shaft and nut and the direction of rotation. As the nut is raised or lowered such axial motion is transmitted through the cage to the seat and valve. The knob can be turned by a user and through the use of axial movement transmitted by threads, the knob permits the valve and shaft and valve seat to be raised relative to the bulkhead. In this manner, the shaft is effectively shortened and the lower end of the shaft will come into contact with the piston surface 160 later in the compression stroke, thereby extending the length of the stroke prior to the opening of the second chamber. Note that a valve/seat combination in a raised position may be lowered by turning the knob thereby causing the communication to occur earlier in the compression stroke.

Figure 11:
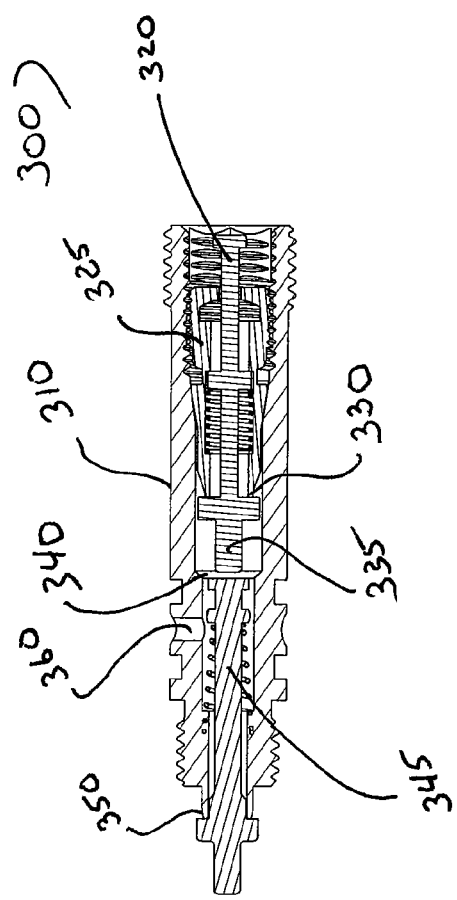
FIG. 11 is a section view showing a novel Schrader-type valve for filling the gas chambers of the air shock, the valve shown in a closed position.
Figure 12:
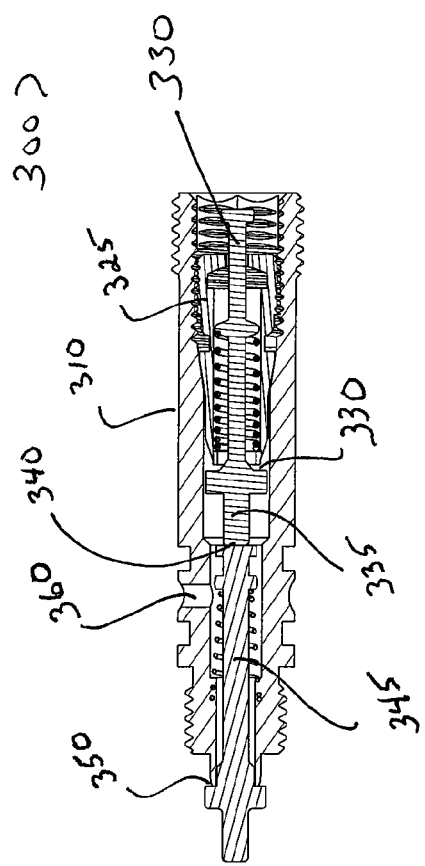
FIG. 12 shows the Schrader-type valve of FIG. 11 in a first, open position.
Figure 13:
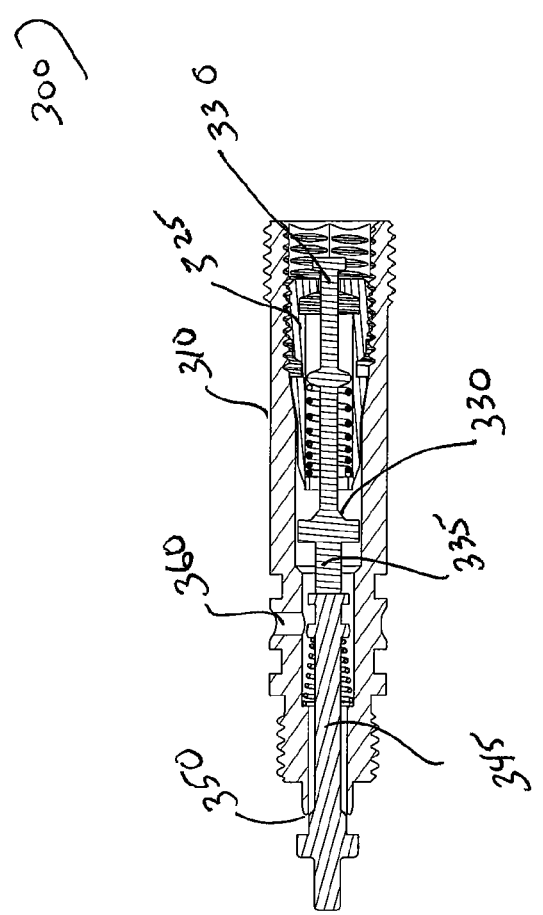
FIG. 13 shows the Schrader-type valve of FIG. 11 in a second, open position.

In one embodiment the first 165 and second 170 chambers are filled by introducing pressure, from a suitable gas pump or other source of pressurized gas, into the gas fill valve 125. In one embodiment the gas fill valve comprises a Schrader-type valve as shown in FIGS. 11-13. Referring to FIG. 11, the valve 300 is designed to fill both of the primary and secondary chambers with pressurized gas from the single valve body 310. In FIG. 11, the valve is closed with no communication of air therethrough.

In one aspect a valve stem 320 is connected through a valve core 325 to a primary fill valve 330 such that axial movement of the spring loaded valve stem 320 causes an opening of the primary fill valve 330 and axial movement of a valve pusher stem 335. Sufficient axial movement of the valve pusher stem 335 closes a gap 340 until the valve pusher stem 335 contacts the second chamber fill valve stem 345. Following such closure of the gap 340, further movement of the valve pusher stem 335 moves the second chamber fill valve stem 345 and correspondingly separates the second chamber fill valve 350 from a valve seat. The design ensures that sufficient axial movement of the valve stem 320 opens the primary fill valve 330 and further movement of the valve stem subsequently opens the second chamber fill valve 350.

FIG. 12 illustrates the Schrader-type valve with the valve stem 320 depressed and primary fill valve 330 open. In this position, pressurized air communicates through the valve 330 and to exit 360 formed in valve body 310 which preferably leads to the first gas chamber of a shock absorber. FIG. 13 illustrates the Schrader-type valve with valve 330 open and gap 340 closed. Further, the second chamber fill valve stem 345 has been axially depressed to open secondary chamber fill valve 350. With the components of the Schrader-type valve in the position shown in FIG. 13, the first and second chambers can be filled simultaneously. Gap 340 can be sized to determine operative characteristics of the valve 300. For example, a gap of 0.050" in one embodiment leaves a gap of sufficient width that second chamber is not inadvertently filled along with the first chamber.

The valve stem 320 may be moved either mechanically, by a probe on a pressure fitting (not shown) of a pressurized gas source, or solely by the introduction of pressurized gas into the fill valve body 310 wherein the pressurized gas acts over the surface area (i.e. piston area) of the primary fill valve 330. In one embodiment, the dimension of the gap 340 is set such that movement of the valve stem 320 and primary fill valve 330, caused solely by the introduction of pressure, is not sufficient under normal operating pressures to close the gap 340 between the valve pusher stem 335 and the secondary chamber fill valve stem 345. Correspondingly, only the primary fill valve 330 is opened allowing pressurized gas to be introduced through primary passage 355 and into the first chamber 165. Such movement sufficient to close the gap and open secondary chamber fill valve 350 may be induce by a gas fill fitting (not shown) connected to the fill gas pressure source and having a protrusion or "stinger" in it that is dimensioned to move the valve stem a sufficient distance to close the gap and open the secondary chamber fill valve. Alternatively, a fitting may be used without a stinger and the valve stem 320 may be moved by gas pressure from the fill gas pressure source. At certain lower velocities (based on lower fill gas pressures or introduction rates) the movement of the valve stem will be insufficient to open the secondary chamber fill valve and only the primary chamber will be filled. Conversely the respective porting of the valve assembly can be reversed (not shown) so that initial movement of the valve stem opens the second chamber and further movement closes the gap and opens the primary chamber.

Optionally, a mechanical probe, attached to a pressure hose fitting (not shown) for example, is used to move the valve stem 320. The length of the probe is sufficient to open the primary fill valve 330, close the gap 340, cause movement of the valve pusher stem 335 and secondary chamber fill valve stem 345 and thereby open the secondary chamber fill valve 350. Correspondingly, pressurized gas flows into the first chamber 165 as previously described and also through the open secondary chamber fill valve 350, permitting flow into the second chamber 170.

The fill valve and shock absorber shown in the Figures herein include o-ring seals as shown and where appropriate. Any suitable seals may be used and seals may be used where not shown or omitted even though shown in any case as appropriate for the channeling and retention of pressurized fluids.

While the invention has been described with only a first and second chambers, it will the invention can be used with three or more separate chambers, each designed to operate together in a sequential fashion. Depending upon the needs of a user for example, a first chamber could be operable to communicate with a second chamber via the communication valve shaft shown in FIGS. 5 and 6 and the secondary chamber could be operable to communicate with the third chamber via the pressure divider illustrated in FIGS. 8 and 9.

While the foregoing is directed to embodiments of the present invention, other and further embodiments of the invention may be devised without departing from the scope thereof, and the scope thereof is determined by the claims that follow.

The invention claimed is:

1. A shock absorber for a vehicle comprising:
a gas spring having first and second gas chambers, the chambers divided by a partition, wherein the first chamber has a first end and an opposing end that move towards each other as the chamber compresses during a first portion of travel of the shock absorber, and wherein the second chamber is not compressed during the first portion of travel and the first and second chambers are both compressed during a second portion of travel;
a fluid path between the first and second gas chambers;
a valve and valve shaft mounted on a wall of the partition with the valve shaft extending toward the opposing end of the first chamber and the valve mounted at a base of the valve shaft, the valve shaft constructed and arranged to contact the opposing end of the first gas chamber at an end of the first portion of travel, thereby opening the path; and
a damper, fluidly isolated from the first and second gas chambers at all times, the damper for regulating the speed of travel throughout both portions of travel and having a piston shaft extending through the first gas chamber, parallel to the valve shaft.

2. The shock absorber of claim 1 wherein the fluid isolated damper comprises damping fluid contained in an additional chamber sealed from the gas spring.

3. The shock absorber of claim 1 wherein a portion of the damper forms a boundary of the gas spring.

4. The shock absorber of claim 3, wherein the boundary comprises a gas spring piston.

5. The shock absorber of claim 1, wherein a portion of the damper traverses the volume of the first gas chamber.

6. The shock absorber of claim 1 wherein, at the end of the first portion of travel, the pressure is substantially the same in the first and second gas chambers.

7. The shock absorber of claim 1 wherein, at the beginning of the first portion of travel, the pressure is substantially the same in the first and second gas chambers.

8. The shock absorber of claim 1, wherein the valve shaft extends non-coaxially into the first gas chamber.

9. The shock absorber of claim 8, wherein the valve shaft is biased to retain the valve in a normally closed position.

10. The shock absorber of claim 1 wherein the damper includes adjustable features including a blow off feature.

11. The shock absorber of claim 1, further including a third chamber.

12. The shock absorber of claim 1, wherein a length of the first portion of travel is adjustable.

13. The shock absorber of claim 12, wherein the length of the first portion of travel is adjusted by changing a length of the valve shaft.

14. The shock absorber of claim 12, wherein the length of the first portion of travel is adjusted by changing the volume of the first gas chamber prior to operating the shock.

15. The shock absorber of claim 1, wherein the fluid path is selectively openable to permit the compression of the first and second gas chambers.

* * * * *